April 17, 1956  W. H. WESSEL  2,742,112
TELESCOPIC SHOCK ABSORBER CONSTRUCTION
Filed July 5, 1951
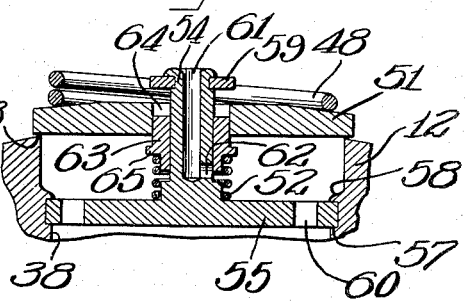
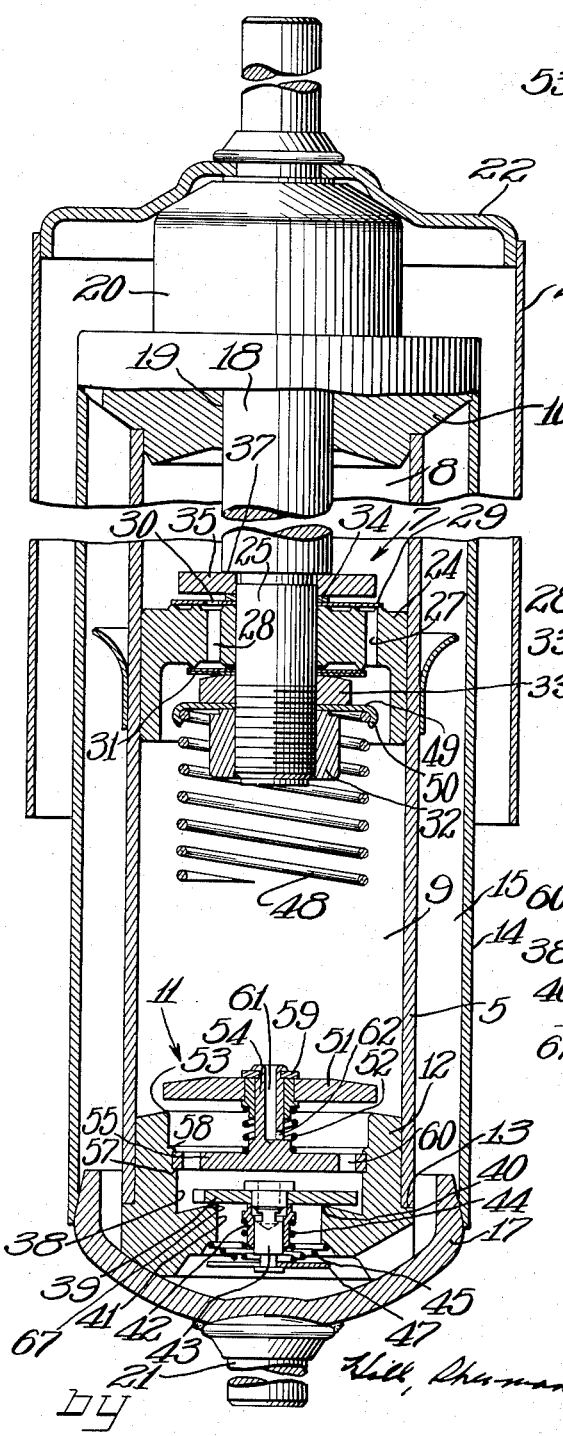
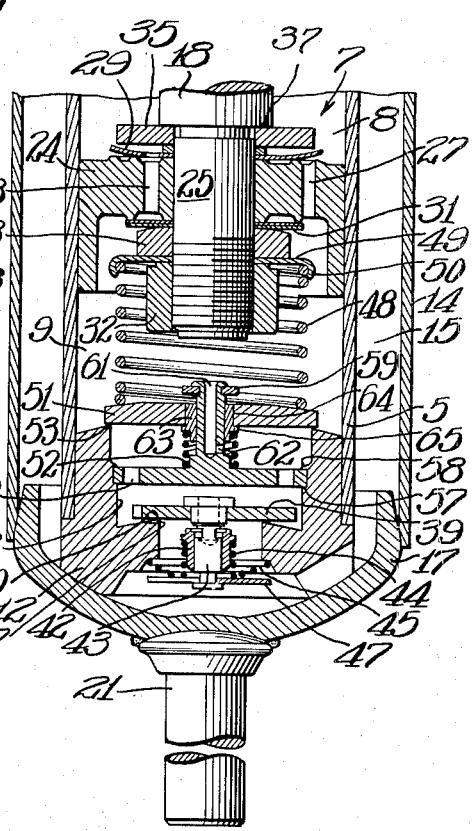
Inventor:
Walter H. Wessel

# United States Patent Office 2,742,112
Patented Apr. 17, 1956

2,742,112

TELESCOPIC SHOCK ABSORBER CONSTRUCTION

Walter H. Wessel, Buffalo, N. Y., assignor to Houdaille-Hershey Corporation, Detroit, Mich., a corporation of Michigan Application July 5, 1951, Serial No. 235,283

13 Claims. (Cl. 188—88)

The present invention relates to improvements in telescopic or direct acting shock absorbers and more particularly concerns improvements in such shock absorbers for preventing bottoming of the sprung and unsprung portions such as the frame and axle of a vehicle at the end of a compression stroke of the shock absorber.

An important object of the present invention is to provide improved means operable near the end of a compression stroke of the piston of a direct acting shock absorber to prevent the condition commonly referred to as "bottoming" in a vehicle or the like with which the shock absorber may be used.

Another object of the invention is to provide an improved foot valve assembly in a direct acting shock absorber responsive to means carried by the piston to afford increased resistance to fluid displacement from the cylinder to the reservoir within a short range of the bottom limit of the compression stroke of the piston.

A further object of the invention is to provide, in a compression displacement control valve assembly for direct acting shock absorbers, novel means for progressively increasing resistance to compression stroke displacement in proportion to the magnitude of compression stroke pressure within the final range of compression stroke movement of the piston within the cylinder of the shock absorber.

Still another object of the invention is to provide in direct acting shock absorbers improved compression displacement cut-off means.

Other objects, features and advantages of the present invention will be readily apparent from the following detailed description of a preferred embodiment thereof taken in conjunction with the accompanying drawing, in which:

Figure 1 is a fragmental vertical sectional view through a direct acting shock absorber embodying the features of the present invention;

Figure 2 is a fragmentary vertical sectional view through the shock absorber of Fig. 1 taken in substantially the same plane and showing the piston and foot valve structures near the end of a compression stroke and with the compression cut-off mechanism in operative relationship; and Figure 3 is a fragmentary sectional view similar to Figure 2 but showing the compression cut-off valve mechanism in a further operative relation.

A telescopic or direct acting shock absorber in which the present invention may be incorporated comprises an elongated cylinder 5 within which is reciprocably disposed a piston assembly 7 dividing the interior of the cylinder 5 into an upper rebound pressure chamber 8 and a lower compression pressure chamber 9.

At its upper end the cylinder 5 is closed by a member 10 while at its lower end the cylinder is assembled with a foot valve assembly 11 including a centrally ported valve cage 12 having a rabbet groove in its outer periphery within which the associated end portion of the cylinder is in press fit assembly.

Concentrically surrounding the cylinder 5 is a reservoir tube 14 of larger diameter and providing a reservoir chamber 15 about the cylinder. At its lower end the reservoir tube 14 is attached to a cup-shaped end closure member 17 within which the valve cage member 12 is seated. At its opposite or upper end, the reservoir tube 14 engages with and preferably holds in assembly the upper closure member 10.

The piston assembly 7 is carried by a piston rod 18 which extends through a bearing bore 19 in the upper closure and bearing member 10. Outwardly beyond the bearing closure member 10 the piston rod projects through a packing gland structure within a housing 20 and the outer end portion of the piston rod is adapted to be attached to one part of a vehicle such as the sprung or chassis portion of the vehicle while the opposite or lower end of the shock absorber is adapted to be attached to the unsprung portion of the vehicle through the medium of an attachment structure 21 secured to the outer side of the lower closure cap 17. A cap member 22 carried by the upper or outer end portion of the piston rod supports a gravel guard 23 concentrically about the reservoir tube 14.

Functioning of the shock absorber is on the principle of resistance to displacement of a hydraulic fluid such as a suitable oil from one side to the other side of the piston assembly 7, and for this purpose rebound and compression chambers 8 and 9, respectively, are filled with the fluid.

Control of displacement of the fluid past the piston assembly 7 is effected by a valved passageway arrangement in the piston assembly. To this end, the piston assembly comprises a cylindrical piston body 24 which is slidably assembled upon a reduced diameter portion 25 of the piston rod. For compression fluid displacement from the compression chamber 9 into the rebound pressure chamber 8, the piston body 24 is provided with an annular series of passages 27, while for displacement of fluid from the rebound chamber 8 into the compression chamber 9, a concentric series of passages 28 is provided. A flexible disk resilient spring valve 29 checks flow of fluid from the rebound pressure chamber 8 through the passages 27 but yields under predetermined compression fluid pressure to permit displacement of fluid from the compression pressure chamber 9 through the piston into the rebound pressure chamber 8. Rebound blow-off displacement of fluid from the rebound pressure chamber 8 through the passages 28 is enabled by way of an opening or openings 30 affording passageway through the disk valve 29 into the passages 28 and in response to predetermined rebound pressure a flexible disk valve assembly 31 is opened at the lower ends of the passages 28. The valve assembly 31 closes the passages 28 against displacement of fluid from the compression pressure chamber 9 through the passages 28.

In the assembly, a nut 32 threaded onto the lower or distal end portion of the reduced diameter piston rod portion 25 drives a shoulder ring 33 against the disk valve assembly 31 which in turn drives against the piston body 24 to clampingly urge the same against the inner margin of the disk ring valve member 29 to urge the same against the spacer ring 34 and the latter against a shoulder ring 35 which in turn bears against a shoulder 37 provided by the larger diameter portion of the piston rod 18.

During compression stroke of the piston assembly 7, displacement of fluid occurs not only from the compression fluid chamber 9 through the piston into the rebound pressure chamber 8, but also from the compression pressure chamber 9 into the reservoir 15 to compensate for the displacement of the piston rod 18 as it moves into the rebound pressure chamber 8. For this purpose, the foot valve assembly 11 includes a counterbore 38 in the inner or upper portion of the foot valve cage member 12 affording clearance for a disk valve 39 which normally rests sealingly upon a valve seat 40 defining the upper end of a central fluid displacement passage 41 through the valve cage. Thereby, compression displacement of fluid through the foot valve assembly is normally prevented except under the control of a cylindrical valve 42 which operatively encircles a laterally ported and centrally bored stem 43 carried by the disk valve 39 and depending through the passage bore 41 of the valve cage. A coiled compression spring 44 normally urges the valve 42 into closed relation.

The valve disk 39 is held to its seat 40 by a light spiral compression spring 45 that is seated at its upper end against the valve cage 12 and at its lower end against a shoulder washer 47 carried by the lower end portion of the valve stem 43. Thus, rebound displacement of fluid from the reservoir 15 into the compression chamber 9 occurs fairly freely during the rebound stroke of the piston 7 by movement of the valve disk 39 from its seat 40. However, compression displacement of fluid from the chamber 9 into the reservoir 15 is resisted by the valve 42.

Shocks of substantial magnitude resulting in compression stroke of the piston 7 will tend to cause the piston to move rapidly toward the foot valve 11. This is especially true in vehicles which in service must travel over rough terrain or roadways, and, unless checked, bottoming of the sprung and unsprung portions of the vehicle may occur. To prevent such bottoming during compression stroke, means are provided on the piston 7 and on the foot valve assembly 11 cooperative during the last phase or portion of the compression stroke to afford substantially increased restraint upon relative compression movement of the piston and cylinder. To this end, the piston assembly 7 carries a downwardly projecting normally expanded coiled helical compression spring 48 which has the upper end thereof attached to a grip plate or disk 49 which is centrally apertured and received about the reduced diameter portion 25 of the piston rod and clamped in position by the nut 32 against the control shoulder member 33. At its outer margin the grip plate 49 is provided with a turned flange 50 providing a grooved radially inwardly opening seat for the upper coil of the spring 48 which is retained in the groove seat and is thereby supported to move with the piston 7.

At its lower end the spring 48 normally projects a substantial distance below the piston 7 but is limited to permit a substantial range of free compression stroke movement of the piston 7 without operation of the anti-bottoming control mechanism.

When the piston 7 approaches the bottoming relation to the foot valve assembly 11, the lower end of the spring 48 engages resiliently against a valve disk 51 which is normally supported by a spring 52 in spaced relation above a valve seat 53 provided at the upper end of the valve cage 12 and defining the upper end of the counterbore 38.

A guide for the valve disk 51 is provided by an upstanding stem 54 carried centrally by a spider disk 55 marginally seating on a shoulder 57 within the counterbore 38 and thereby retained in position spaced above the control valve 39 to afford sufficient head room for movement of the valve 39 from its seat 40, but affording a limit stop for upward movement of the valve 39. A retaining flange 58 is spun down against the upper side of the margin of the disk 55 to secure it in place.

At its upper end the stem 54 projects substantially above the top of the valve cage 12 and has secured thereto a shoulder washer 59 which overlies the inner margin of the valve disk member 51 to define the limit of upward movement of the valve disk 51 under the influence of the spring 52.

When during the compression stroke of the piston 7 the spring 48 bears against the valve member 51 with sufficient pressure to overcome the spring 52, the valve 51 is moved against its seat 53 and thereby cuts off normal compression stroke displacement of fluid through the foot valve, such displacement occurring freely past the unseated valve 51 and through openings 60 in the spider disk 55 during normal operation.

However it is desirable to permit continuing limited and restricted compression fluid displacement even after the valve 51 is closed so as to avoid hard or sudden stopping of the compression stroke. For this purpose a compression fluid displacement by-pass passage 61 of restricted flow area is provided through the stem 54. Thereby compression pressure and resistance to displacement of fluid from the compression chamber 9 is substantially raised when the valve 51 is driven against its seat 53 by compression of the spring 48 thereagainst substantially as shown in Figure 2. It will be observed that the by-pass metering passage 61 comprises a blind end axial bore in the stem 54 opening from the top of the stem above the stop abutment washer 59 and communicating with the chamber defined between the valve 51 and the spider disk 55 through a lateral port 62 opening therefrom above the spider disk 55.

As still higher pressures are generated in the compression chamber 9 further reduction in compression fluid displacement is effected to increase the compression resistance of the shock absorber, by reducing the flow through the port or orifice 62. This is effected by providing a sleeve valve 63 about the stem 54 and slidably reciprocable in a central bore 64 in the valve disk 51. The sleeve valve 63 is of smaller external diameter than the outside diameter of the stop washer 59 so that the stop washer will overlap not only the outer end of the sleeve valve 63 but also the surrounding inner margin of the valve disk 51. The sleeve valve 63 has a radially extending intermediate shoulder flange 65 against which the upper end of the compression biasing spring 52 bears and which shoulder flange in turn normally bears against the underside of the inner margin of the disk valve 51. Thereby, the sleeve valve 63 is normally maintained by the spring 52 in its non-operating relation wherein the lower end of the sleeve valve 63 is, even in the seated position of the disk valve 51, free from throttling relation to the orifice port 62. The normal positions of the sleeve valve 63 are shown in Figs. 1 and 2.

When the main bottoming control throttle valve disk 51 is driven against its seat 53 by the spring 48, the head end of the sleeve valve 63 is moved away from the abutment washer 59 and is thus exposed to the pressure of fluid in the compression chamber 9. Hence, when the pressure in the compression chamber 9 increases beyond a predetermined value as determined by the force of the now partially compressed biasing spring 52 and the area of the head of the sleeve valve 63 exposed to the fluid pressure, the sleeve valve 63 is driven slidably downwardly in further opposition to the biasing spring 52 (Fig. 3) and the lower end of the sleeve valve enters into fluid flow throttling relation to the orifice 62 by blocking the orifice to the extent of the additional compression stroke pressure in the compression chamber 9 and corresponding reduction in flow area at the mouth of the orifice. The resistance relationship of the compressed biasing spring 52 and the area of the sleeve valve 63 exposed to pressure is preferably such that the orifice 62 will be closed by the sleeve valve only under unusual ultimate or terminal compression stroke pressures. Therefore, as a result of the multi-stage compression blow-off control afforded by the foot valve assembly 11 starting with functioning of the compression blow-off control valve 42 and then in the last stages of the compression stroke by the primary anti-bottoming control valve 51 and finally by the sleeve valve 63, a smooth and effective shock absorber action during compression stroke is attained right down to the terminal portion of the stroke.

In the rebound stroke of the piston assembly 7, relatively free flow of replenishing fluid from the reservoir 15 through the passageway under the foot valve cage 12 and up through the foot valve assembly is promptly established by return of the sleeve valve 63 from its operative position as indicated in Fig. 3 to its inactive position shown in Fig. 2 promptly upon release of the high terminal pressure of the compression stroke, and then snapping of the control valve 51 open promptly upon release of the compression spring 48 therefrom and then raising of the foot valve disc 39 from its seat for replenishment flow past the valve 39 through the spider passages 60 and past the unseated bottoming control valve 51. During normal compression strokes of the piston 7 of a magnitude less than will bring the resilient biasing member or spring 48 into valve closing relation to the bottoming control valve 51, compression fluid blow-off control is handled entirely by the foot valve members 39 and 42, with respect to the foot valve assembly 11.

By preference, limited metered free flow of fluid past the valve disk 39 is provided for by one or more small orifice grooves or indentations 67 extending radially through the annular valve seat 40.

It will be understood that modifications and variations may be effected without departing from the scope of the novel concepts of the present invention.

I claim as my invention:

1. In combination in a direct acting shock absorber including a cylinder and a piston reciprocable in the cylinder in compression and rebound strokes, a reservoir chamber about the cylinder, a foot valve controlling displacement of fluid from the cylinder to the reservoir chamber during compression strokes of the piston, said piston having resilient biasing means projecting therefrom toward the foot valve but normally maintained by the normal operating position of the piston in spaced relation to the foot valve, and auxiliary control means carried by the foot valve and engageable by said resilient biasing means to restrict the flow of displaced fluid from the cylinder into the reservoir chamber through the foot valve near the end of a compression stroke of the piston when the resilient biasing means engages said auxiliary control means, said resilient biasing means being entirely separable away from said auxiliary control means during rebound strokes of the piston.

2. In a direct acting shock absorber construction wherein a piston operable reciprocably in a cylinder displaces fluid from the cylinder into a reservoir through a control valve assembly, said control valve assembly including a first valve structure for controlling fluid displacement thereby in one direction from the cylinder into the reservoir during a stroke of the piston in the cylinder in one direction, a second control valve structure associated with said valve assembly together with piston carried means for operating said second control valve structure when the piston approaches bottoming with respect to said valve assembly in said stroke in said one direction, whereby to operate said second valve structure to throttle fluid displacement and increase resistance to further movement of the piston in said one direction, and a third valve structure associated with said valve assembly and pressure responsive to afford further resistance to displacement of fluid from the cylinder to the reservoir in the terminal portion of the piston stroke in said one direction when pressures of greater than predetermined magnitude are generated in said terminal portion of the piston stroke.

3. In a direct acting shock absorber assembly, a cylinder, a reservoir, a foot valve between the cylinder and reservoir, a piston operable in the cylinder and in a compression stroke displacing fluid from the cylinder through the foot valve into the reservoir, the foot valve including a throttle valve member carried thereby and normally biased into fully open position, means limiting opening movement of the throttle valve member to a predetermined short range of opening movement, and a resilient biasing member carried by the piston and projecting therefrom and engageable with said throttle valve member upon approach of the piston to bottoming relation to the foot valve assembly to close said throttle valve member the piston being movable through a long operating stroke range beyond and relative to the throttle valve member in the fully open position of the latter as determined by said limiting means.

4. In combination in a direct acting shock absorber assembly, a cylinder, a reservoir, a foot valve assembled with one end of the cylinder and including a valve cage having a passage therethrough, a piston operable in the cylinder to displace fluid from the cylinder into the reservoir upon a compression stroke of the piston, a primary control valve mechanism carried by the valve cage to control compression fluid displacement therethrough, a secondary control valve mechanism carried by the cage and including a spider member affording free flow of fluid therethrough and having a stem projecting therefrom toward the piston, a throttle valve disk carried reciprocably by said stem and having a biasing spring normally urging the same into open position, said valve cage affording a valve seat for said throttle valve disk from which the valve disk is normally maintained in spaced relation by the biasing spring, and resilient biasing means carried by the piston engageable with said valve disk to urge the same in opposition to its biasing spring into closed relation to said valve seat when the piston approaches bottoming relation to the foot valve.

5. In combination in a direct acting shock absorber assembly, a cylinder, a reservoir, a foot valve assembled with one end of the cylinder and including a valve cage having a passage therethrough, a piston operable in the cylinder to displace fluid from the cylinder into the reservoir upon a compression stroke of the piston, a primary control valve mechanism carried by the valve cage to control compression fluid displacement therethrough, a secondary control valve mechanism carried by the cage and including a spider member affording free flow of fluid therethrough and having a stem projecting therefrom toward the piston, a throttle valve disk carried reciprocably by said stem and having a biasing spring normally urging the same into open position, said valve cage affording a valve seat for said throttle valve disk from which the valve disk is normally maintained in spaced relation by the biasing spring, and resilient biasing means carried by the piston engageable with said valve disk to urge the same in opposition to its biasing spring into closed relation to said valve seat when the piston approaches bottoming relation to the foot valve, said stem having a by-pass bleed passage therethrough for restricted displacement of fluid therethrough on the compression stroke of the piston after said throttle valve disk has been moved to closed position.

6. In combination in a direct acting shock absorber assembly, a cylinder, a reservoir, a foot valve assembled with one end of the cylinder and including a valve cage having a passage therethrough, a piston operable in the cylinder to displace fluid from the cylinder into the reservoir upon a compression stroke of the piston, a primary control valve mechanism carried by the valve cage to control compression fluid displacement therethrough, a secondary control valve mechanism carried by the cage and including a spider member affording free flow of fluid therethrough and having a stem projecting therefrom toward the piston, a throttle valve disk carried reciprocably by said stem and having a biasing spring normally urging the same into open position, said valve cage affording a valve seat for said throttle valve disk from which the valve disk is normally maintained in spaced relation by the biasing spring, resilient biasing means carried by the piston engageable with said valve disk to urge the same in opposition to its biasing spring into closed relation to said valve seat when the piston approaches bottoming relation to the foot valve, said stem having a by-pass bleed passage therethrough for restricted displacement of fluid therethrough on the compression stroke of the piston after said throttle valve disk has been moved to closed position, and a pressure responsive valve carried by said stem for throttling said by-pass passage upon the development of excessive pressure during the terminal portion of the compression stroke of the piston.

7. In a direct acting shock absorber construction having a hydraulic piston, a foot valve assembly including a cage member having a passage therethrough, a primary control valve assembly, a secondary control valve assembly spaced above the primary control valve assembly and including a valve member mechanically operable by piston imposed pressure for throttling flow through the valve assembly when the piston approaches close to the valve assembly, said secondary control valve assembly including a metering by-pass passage, and a pressure responsive throttling valve for controlling said by-pass passage.

8. In a direct acting shock absorber construction, a foot valve assembly including a cage having lower compression blow-off control valve means and upper bottoming control throttle valve means, said throttle valve means including a spider carried by the cage and having an upwardly projecting stem with a control valve reciprocably mounted on said stem and normally biased into open position.

9. In a direct acting shock absorber construction, a foot valve assembly including a support member, a valve seat on said support member, a primary compression blow-off control valve assembly in operative association with said valve seat, a second valve seat spaced above said first valve seat, a supporting spider carried by said supporting member and having a stem projecting upwardly therefrom above said upper valve seat, a reciprocable disk valve carried by said stem, a spring normally biasing said disk valve upwardly away from said upper valve seat, and a stop carried by the upper end portion of the stem for limiting the unseating movement of the disk valve.

10. In a direct acting shock absorber construction, a foot valve assembly including a valve cage member having a passage therethrough, a primary compression blow-off control valve assembly in the lower part of the valve cage, a valve seat provided by the upper portion of the valve cage, a spider carried by the valve cage below said upper valve seat, a stem projecting upwardly from the spider above said upper valve seat, and a reciprocable disk valve carried by the stem and normally biased into position above the upper valve seat but movable in response to piston pressure into closing relation to said valve seat.

11. In a direct acting shock absorber construction, a foot valve assembly including a valve cage member having a passage therethrough, a primary compression blow-off control valve assembly in the lower part of the valve cage, a valve seat provided by the upper portion of the valve cage, a spider carried by the valve cage below said upper valve seat, a stem projecting upwardly from the spider above said upper valve seat, a reciprocable disk valve carried by the stem and normally biased into position above the upper valve seat but movable in response to piston pressure into closing relation to said valve seat, said disk valve having a central aperture, said stem having a metering orifice, and a sleeve valve mounted about the stem and in said disk valve aperture and normally movable with the disk valve, said sleeve being fluid pressure responsive after seating of said disk valve to move relative to both said stem and said disk valve for throttling said orifice.

12. In a direct acting shock absorber construction, a foot valve structure including a valve cage body member having a central passage therethrough, means defining a valve seat adjacent the lower end of the valve cage, a primary compression blow-off control valve associated with said valve seat, a valve seat provided at the upper end portion of the valve cage member, a spider member carried by the valve cage member between said valve seats and above the lower control valve member and carrying an anti-bottoming throttle valve, said spider member limiting movement of the primary control valve from its seat.

13. In a direct acting shock absorber construction including a cylinder and a reservoir about the cylinder with a foot valve assembly controlling displacement of fluid between the cylinder and reservoir responsive to the strokes of a piston in the cylinder, an auxiliary foot valve member, means in the foot valve assembly for guiding said auxiliary valve member into and out of open and closed positions, means normally biasing the auxiliary valve member into open position, and a yieldable structure projecting from the piston and normally separated from but engageable with the auxiliary valve member when the piston approaches bottoming relation to the foot valve assembly, to actuate the valve member from open position toward closed position in opposition to said biasing means for throttling compression displacement of fluid, whereby to increase the compression blow-off resistance to displacement of fluid from the cylinder to the reservoir chamber.

References Cited in the file of this patent

UNITED STATES PATENTS

| | | |
|---|---|---|
| 2,148,839 | Rossman et al. | Feb. 28, 1939 |
| 2,345,547 | Roth et al. | Mar. 28, 1944 |
| 2,379,750 | Rossman | July 3, 1945 |
| 2,395,027 | Whisler | Feb. 19, 1946 |
| 2,409,349 | Focht | Oct. 15, 1946 |
| 2,619,199 | Schwary | Nov. 25, 1952 |